(12) United States Patent
Bovee et al.

(10) Patent No.: US 7,590,600 B2
(45) Date of Patent: Sep. 15, 2009

(54) SELF-CONTAINED RIGHTS MANAGEMENT FOR NON-VOLATILE MEMORY

(75) Inventors: James C. Bovee, Redmond, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 11/277,660

(22) Filed: Mar. 28, 2006

(65) Prior Publication Data

US 2007/0233609 A1 Oct. 4, 2007

(51) Int. Cl.
*G06Q 99/00* (2006.01)

(52) U.S. Cl. .............................. 705/59; 705/51; 726/26

(58) Field of Classification Search ............. 705/50–79; 726/26–33
See application file for complete search history.

(56) References Cited

U.S. PATENT DOCUMENTS

| | | | |
|---|---|---|---|
| 5,511,020 A | | 4/1996 | Hu et al. |
| 5,835,413 A | | 11/1998 | Hurter et al. |
| 6,014,443 A | * | 1/2000 | Mochizuki et al. .......... 713/193 |
| 6,169,691 B1 | | 1/2001 | Pasotti et al. |
| 6,339,557 B1 | | 1/2002 | Kawaguchi et al. |
| 6,469,925 B1 | | 10/2002 | Jain |
| 6,982,907 B1 | | 1/2006 | Mirgorodski, et al. |
| 7,227,952 B2 | * | 6/2007 | Qawami et al. ............. 380/201 |
| 2004/0130942 A1 | | 7/2004 | Yeh et al. |
| 2004/0230879 A1 | | 11/2004 | Crosby |
| 2005/0116286 A1 | | 6/2005 | Schuler et al. |
| 2005/0121712 A1 | | 6/2005 | Park et al. |
| 2005/0192906 A1 | * | 9/2005 | Berstis ........................ 705/59 |
| 2005/0270851 A1 | | 12/2005 | Kato et al. |
| 2005/0285219 A1 | | 12/2005 | Sakagami |
| 2007/0058923 A1 | * | 3/2007 | Buhler ........................ 386/46 |

OTHER PUBLICATIONS

"Mechanism influencing DRAM cell retention time fluctuation clarified," accessed through website http://ir.elpida.com/en/pdf/2005-12-08e.pdf, Dec. 8, 2005.
"An embodiment 512-bit nonvolatile memory with ferroelectric storage cell," accessed through website at http://ieeexplore.ieee.org/search/wrapper.jsp?arnumber-5940.

* cited by examiner

*Primary Examiner*—Jalatee Worjloh
(74) *Attorney, Agent, or Firm*—Shook, Hardy & Bacon L.L.P.

(57) ABSTRACT

Access rights may be managed using non-volatile memory. The charge retention characteristics in devices with non-volatile memory are used to establish time-limited rights. Time duration is calculated using the floating gate in a storage cell. First, time-limited rights are determined from a license. Second, a set of computer software selects a time-sensitive storage cell, containing the floating gate, in the non-volatile memory that approximates the required time duration in the license.

9 Claims, 5 Drawing Sheets

SELF-CONTAINED RIGHTS MANAGEMENT FOR NON-VOLATILE MEMORY

CROSS-REFERENCE TO RELATED APPLICATIONS

Not applicable

STATEMENT REGARDING FEDERALLY SPONSORED RESEARCH OR DEVELOPMENT

Not applicable.

BACKGROUND

Several digital rights management (DRM) platforms provide for a rich combination of rights and restrictions for governing rights-managed data. Extending rights management capability beyond computers, audio-players, portable media centers, and pocket PCs is an important goal. Today, the listed devices may enforce rights using expiration dates, limited play counts, etc. However, a desirable goal would be to extend this capability to passive non-volatile memory (NVM) cards such as compact flash, secure digital, xD-picture card, multi-media card, memory stick, and multi-memory card.

While implementing restrictions based on play count or transfer may be easy for NVM cards, based on software operating in these NVM cards, time-restricted rights management presents a unique challenge. The challenge stems from the passive nature of these cards and their usage patterns. At any given moment, an NVM card may find itself plugged into one of a variety of host environments including computers, portable media devices, car stereos, cameras, etc. Not all of these environments guarantee access to a secure clock or secure time server to enable a time-limited right. Therefore, the NVM card must autonomously measure the passage of time without dependence on a host environment to enforce time-limited rights in a portable manner.

One solution has been to change the nature of NVM cards from being passive to active including a clock circuit and a battery in the packaging. This battery has to either possess enough self-contained capacity to last for a lifetime of the device or have the ability to maintain an equivalent charge state for a specified amount of time. Either way, the battery must be capable of continuously delivering conservatively 1-2 micro-Amps of current to keep the clock circuit functioning while the NVM card is not inserted into a host to draw power. In addition, the expense and bulk of the NVM card becomes undesirable.

A solution that provides a NVM card that can provide time-limited rights without requiring a battery or clock would be more desirable.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure describes, among other things, an approach to managing access rights using non-volatile memory. The various solutions are summarized below.

In a first aspect, a method is provided for establishing time-limited rights for a content that includes receiving a license associated with the content. A time-limit value is determined from the license to establish a lifetime of the license. The time-limit value is associated with a storage cell in the device. The storage cell has a charge decay approximately equal to the time-limit value, to establish the lifetime of the license.

In another aspect, a method is provided for setting a lifetime of a license in a device, without a battery, associated with a content that includes operating software on the device that can connect to a host. An encrypted content from the host is received at the device. A license with a key is also received at the device. A location in the memory of the device is determined to store the key. The location is associated with a member of an array of memory cells with an original unique lifespan. The key is stored in the location of the memory. A time limit in the license corresponds with the member in the array with the original unique lifespan. During the lifespan, the key is used to decrypt the content. When the original unique lifespan for the member expires and an attempt to access the key is made, a notice is provided that the content is inaccessible or the license is expired.

In yet another aspect, a system is provided for using a content with a time-limited license on a client. A client software operates on the client to write the content to the storage area in the client, store the license or the data in the protected area of the storage area, select an address or a storage cell with a decreasing lifespan equal to an area, capacitance, and a programming time for the address or the storage cell that provides an approximation of the license lifetime, store the key in the address or the storage cell where an ending of the decreasing lifespan terminates the key or invalidates the license, or terminate an access to the content when the key is terminated or the license is invalidated.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION

The present invention will be better understood from the detailed description provided below and from the accompanying drawings of various embodiments of the invention, which describe, for example, an approach to managing access right using non-volatile memory. The detailed description and drawings, however, should not be read to limit the invention to the specific embodiments. Rather, these specifics are provided for explanatory purposes that help the invention to be better understood.

Exemplary Operating Environment

Figure 1:
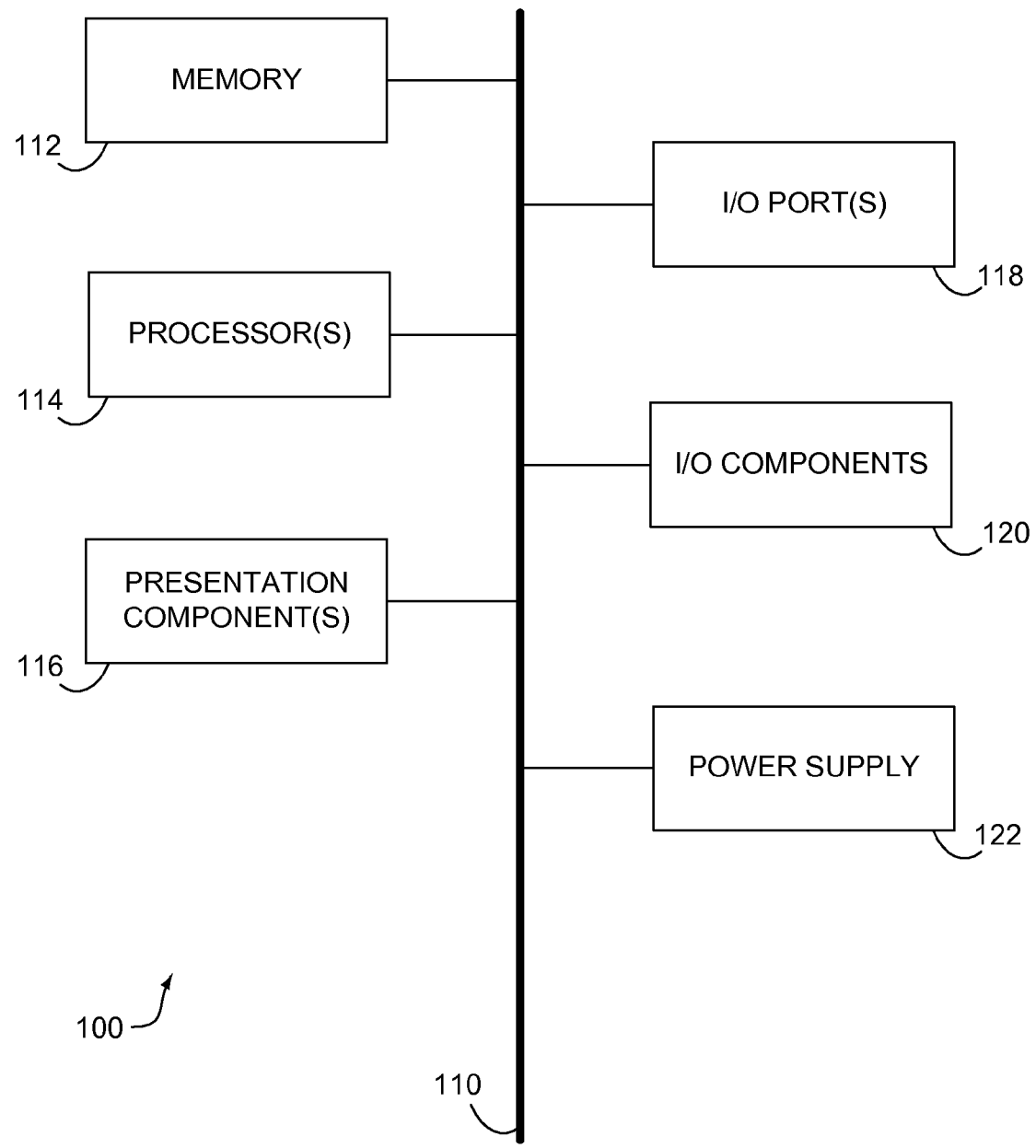
FIG. 1 is an exemplary operating environment suitable for practicing an embodiment of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

To help explain the invention without obscuring its functionality, an embodiment will now be referenced. Although the present invention can be employed in connection with a computing-network environment, it should not be construed as limited to the exemplary applications provided here for illustrative purposes.

Rights Management Using Non-Volatile Memory Devices

An embodiment of the present invention uses the charge retention characteristics inherent in the floating gate transistor of non-volatile memory. In addition, it incorporates a microcontroller that may be existent in NVM cards. Embodiments of the present invention may be implemented with a set of software or a semiconductor process to manage data placement based on a charge retention performance of the floating gates for a small sub-array of storage cells. The detailed description following further describes implementing embodiments of the present invention.

Figure 2:
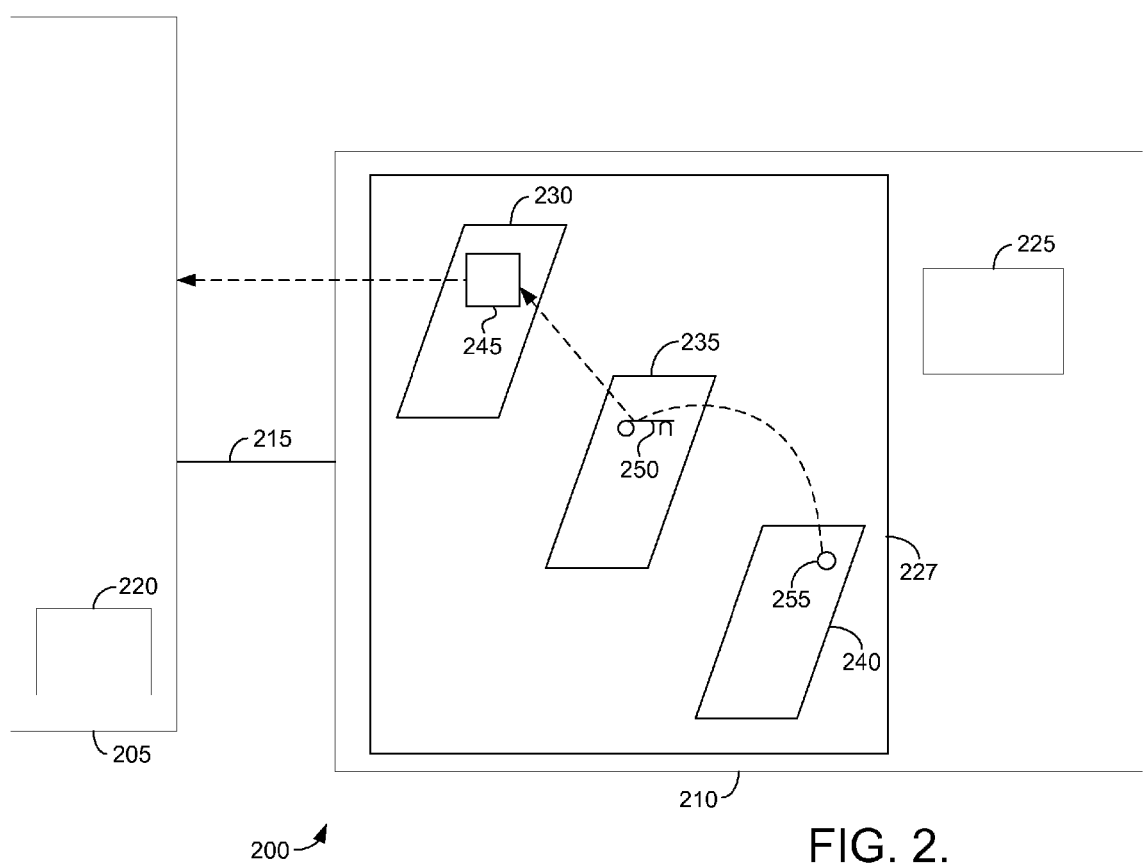
FIG. 2 is a block diagram of an exemplary host and card operating in an implementation of an embodiment of the present invention.

In FIG. 2, an exemplary host 205 and card 210 are shown in an operating environment 200. As stated above, card 210 may be an NVM card such as a compact flash, secure digital, xD-picture card, multi-media card, memory stick, multi-memory card, or any other device capable of having a non-volatile memory. Card 210 has an ability to connect via 215 to host 205. Although 215 is shown as a line in FIG. 2, card 210 may connect to host 205 by way of a slot in host 205. Card 210 may be inserted into host 205. Host 205 may be a computing device, portable media device, car stereo, or camera to name a few. Although not described here, host 205 and card 210 have the appropriate interface to enable a connection between the two of them via 215.

Host 205 has a set of software 220 that operates on host 205 to interact with card 210 and controls various activities that occur between host 205 and card 210. Card 210 has a set of software 225 that operates on card 210 to interact with host 205 and controls various activities that occur between card 210 and host 205. Card 210 has a memory 227 that is controlled with software 225. Although not shown, software 225 either operates a controller or operates on a controller in card 210 to control memory 227.

An embodiment of the present invention shows memory 227 with three distinct sections, a general memory 230, a protected memory 235, and a time-sensitive memory 240. Details of memory 227 shall be discussed further in FIG. 5. For now, memory 227 may be viewed as having three memory components although other embodiments may show memory 227 with different components and layouts.

General memory 230 stores a content file 245. Host 205 may store file data to general memory 230, or card 210 may exist with pre-loaded content file 245 in general memory 230. For example, a user operating host 205 may desire to play a music file stored on card 210. The user can connect card 210 to host 205 to access content file 245. However, content file 245 may be encrypted or restricted such that a license is required to play content file 245.

A license (not shown) may be loaded into protected memory 235. Within the license, a key 250 may be stored. Key 250 is used to enable software to decrypt content file 245 so that the user may access content file 245 from host 205. Although the example above describes a music file, other types of data may employ this concept including but not limited to video files, digital documents, executable programs, additional encryption keys, etc.

In implementing an embodiment of the present invention, card 210 does not have or need a battery to maintain clock synchronization and other functions. However, the license stored at protected memory 235 may require a time-limit right. Card 210, therefore, has to keep track of time to allow a determination of whether the license is valid. Time-sensitive memory 240 provides a reliable timing sequence that allows the tracking of time for the purpose of approximating the lifespan of the license. Time-sensitive memory 240 is discussed further regarding the timing sequence. In FIG. 2, key 250 is linked to a storage cell 255 to provide host 205 with access to file content 245. With software 225, storage cell 255 is selected to provide a timing sequence that approximates the required lifetime of the license stored in protected memory 235. While the license is valid, key 250 is accessible to allow an access to content 245 in general memory 230. It should be noted that the terms "storage cell" and "memory cell" are used throughout the specification. The terms have the same meaning and may be used interchangeably.

Figure 3:
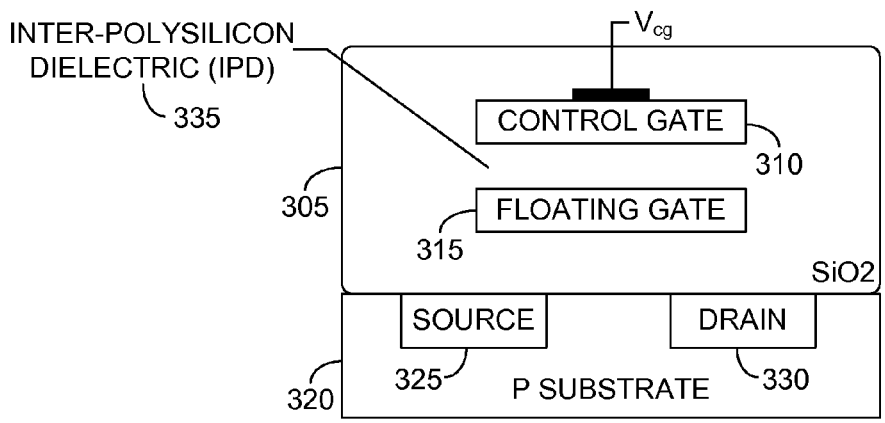
FIG. 3 is a block diagram of an exemplary storage cell illustrating semiconductor characteristics for practicing an embodiment of the present invention.

As best seen in FIG. 3, time-sensitive memory 240 is preferably a storage cell 300 with semiconductor characteristics. In 300, a semiconductor view of the storage cell shows silicon dioxide ($SiO_2$) 305 with a control gate 310 and a floating gate 315. Silicon dioxide 305 is connected to a substrate 320 which contains a source 325 and a drain 330. Although silicon dioxide is described in FIG. 3, other chemical compounds with semiconductor characteristics may be used.

A thinner top oxide layer between control gate 310 and floating gate 315 provides an inter-polysilicon dielectric (IPD) 335. IPD 335 together with a possible lower dielectric in silicon dioxide 305 may lead to a shorter charge retention time in floating gate 315. Instead of ten (10) years, the charge retention time may be reduced to thirty (30) days or another timeframe. A programming algorithm (225) operating on the microcontroller in card 210 may rely on the charge retention feature to enforce a time-limited license.

Figure 4:
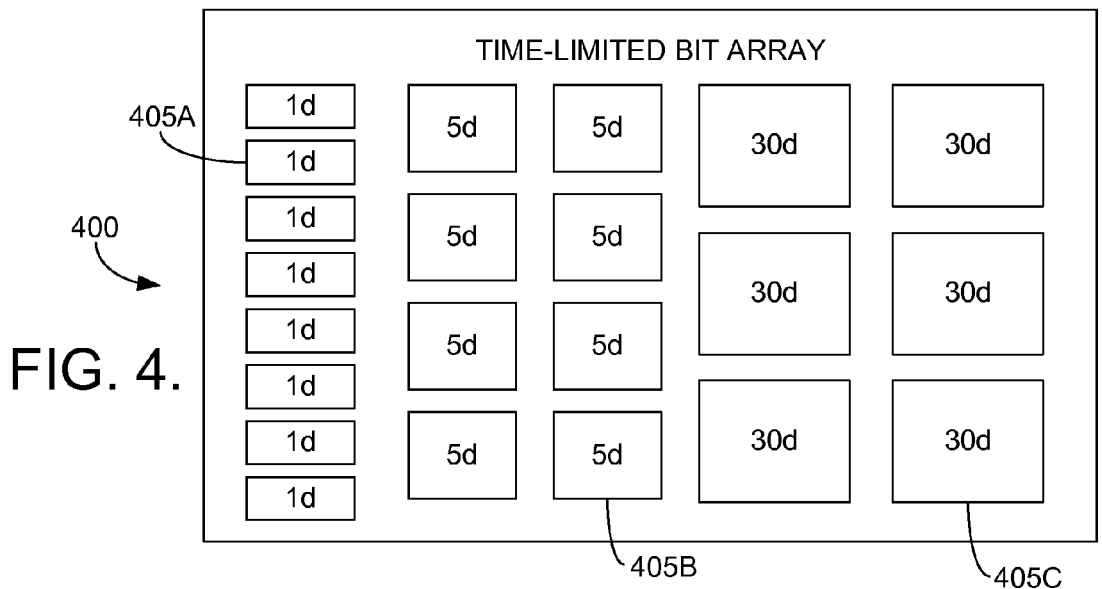
FIG. 4 is a block diagram of an exemplary array of memory cells suitable for practicing an embodiment of the present invention.

The act of programming a memory cell shifts control gate 310's threshold voltage by an amount shown by the formula $\Delta V_T = -\Delta Q_{fg}/C_{fg}$ where $\Delta V_T = V_T(\text{programmed}) - V_T(\text{initial})$ and $\Delta Q_{fg} = Q_{fg}(\text{programmed}) - Q_{fg}(\text{initial})$. As a result, electron discharge is moved to floating gate 315 in an amount provided by $\Delta Q_{fg} = I_g \Delta t$ where $\Delta t$ is the programming time and $I_g$ is a probabilistic gate current occurring during the programming event. After programming is complete, the new threshold voltage of a memory cell in the programmed state becomes $V_T = V_{ti} + \Delta Q_{fg}/C_{fg}$ where $C_{fg}$ is the floating gate to control gate capacitance and this floating gate capacitance is modeled by $C_{fg} = \in A/d$. A is equal to an area existing from floating gate 315 to control gate 310. d is equal to a distance between floating gate 315 and control gate 310. $\in$ is a dielectric constant of the oxide, like silicon dioxide 305. The time-sensitive nature of this programmed state may be modeled as $\Delta Q_{fg} = C_{fg} \Delta V_T$ where the amount of time required for the threshold voltage $V_T$ to reach an asserted low, or FALSE state, is time-dependent and governed by the floating gate capacitance $C_{fg}$, and the change in the floating gate charge is $\Delta Q_{fg} = I_{leakage} \Delta t_{leakage}$. So, for a given constant $I_{leakage}$ current, the amount of time required to reach a threshold value $V_T$ that represents the asserted FALSE is controlled by the capacitance of floating gate 315. The leakage current is related to the quality of the gate oxide used for the device, and like $\in$, is an inherent property of the semiconductor manufacturing process itself. Therefore, the aspects which may be controlled are A and d for the device where A is controlled by varying the geometry of the device. So, for a given constant leakage current, individual cells may vary according to their area A and thus vary their rate of change $\delta V_T/\delta t$ for a given constant $\delta Q_{fg}/\delta t$ inherent for the oxide. Thus, an array of cells with various areas A is able to provide a range of available time-limits from which the programming algorithm may choose. FIG. 4 illustrates this concept.

In FIG. 4, an exemplary array of memory cells is shown in 400. Each unit 405 represents a bit or storage cell with a given gross retention time such as five (5) days. The retention time may be further modified by the selection of a programming time using the programming algorithm that either increases or decreases the retention time by an increment. As shown in FIG. 4, unit 405A provides a retention time of one (1) day, unit 405B provides a retention time of five (5) days, and unit 405C provides a retention time of thirty (30) days.

The programming algorithm and physical layout of the NVM chip should strike a balance between acceptable values of $\Delta t_{program}$ together with an array of values for the metal-oxide semiconductor (MOS) channel area, A, influencing $C_{fg}$ for the bit (as governed by $\in$, A, and d) that will result in an acceptable range of required $\Delta Q_{fg}$ that together with the given $I_{leakage}$ for the chip ultimately results in a range of selectable values $\Delta t_{leakage}$ associated with a range of desired charge retention times for time-programmable logical bits corresponding to a range of time-limits chosen for a time-limited license function. The overall goal is to provide an adequate and usable range of time-limit values. In other words, the goal is to control how long before the charge drops below some threshold value that changes the logical value from an asserted TRUE to an asserted FALSE. The programming algorithm employed by the controller selects the correct cell whose area and thus $C_{fg}$ together with a programming time results in a close approximation of the desired license lifetime.

With the information described above, another embodiment of the present invention may be implemented using a licensing chaining strategy. This strategy limits the number of time-sensitive storage cells that are required to time-limit a large number of files or content that are all transferred on the same date with the same limit.

In addition to selecting the correct storage cell and programming time, the programming algorithm may operate with consideration that altering the retention time of floating gate 315 may affect the endurance characteristics of the memory cell. Such altered cells may experience an accelerated degradation with respect to programming cycles as compared to the other normal high-retention memory cells. This is expected due to a reduced oxide thickness and increased leakage current. Since the useable lifetime of these special bits may be reduced, an accommodation of this fact may be factored into the programming algorithm when implementing an embodiment of present invention. Those accommodations may include the following: 1) Limiting the number of times a particular bit is programmed and used before it is retired from consideration; 2) Spreading the programming duty evenly among the available memory cells; and 3) Dynamically detecting cell suitability by measuring the drain to gate current during the programming operation, storing a list of those values, and noting how the current has changed over time. The memory cell may be flagged as non-suitable as the trend indicates—well in advance of an actual failure to meet the requirements for time-sensitive programmability accuracy.

Figure 5:
FIG. 5 is a block diagram of an exemplary memory layout in an NVM card suitable for practicing an embodiment of the present invention.

Turning now to FIG. 5, an exemplary memory layout 500 is shown for an NVM card 210. Memory layout 500 shows two main partitions of memory cells, a clear store 505, referred to above as general memory 230, and a protected store 510, referred to above as protected memory 235. Clear store 505 is a location that may be accessed by a user when storing data such as files. Clear store 505 is the partition that may be seen by the user when operating a computer. For example, clear store 505 may appear as the F: drive that the user may access when operating an operating system. Access to clear store 505 is provided without restriction as the user may freely read/write/delete files contained in this area.

Protected store 510 provides limited access to the user or other devices. Protected store 510 is the location where sensitive data like license information and symmetric keys required for decryption are stored. Host 205 is first authorized before a controller in card 210 grants permission and stores data in this area on behalf of host 205. This data is not directly visible to the user.

Protected store 510 may be further divided into a normal retention time store and a time-limited store 515, referred to above as time-sensitive memory 240. Time-limited store 515 contains bits that once programmed TRUE (as discussed above) may change over time to the programmed FALSE state. The rate at which this change occurs varies according to the location of the bit in the time-limited bit array (400) and the program time. Both of these parameters are chosen by the programming algorithm according to a time-limit value indicated in the license attached to content file 245 when it is transferred from host 205 to NVM card 210, or as indicated by the host and embodied in the protocol used to select a destination memory of the desired characteristics.

When host 205 writes protected data to card 210, host 205 may first determine if card 210 has the ability to enforce the denoted rights. This may be accomplished using exemplary custom small computer system interface (SCSI) pass-through commands to card 210. Other types of commands may be employed to accomplish the task. The commands allow card 210 to respond with its capabilities with respect to rights enforcement. If card 210 cannot enforce all of the required rights, such as time-restricted rights, host 205 may notify the user that content file 245 cannot be licensed to card 210.

If card 210 can enforce the requested rights, data transfer may begin in an exemplary following manner for the embodiment. Host 205 is first authorized by card 210. If authorization is successful, one or more keys are exchanged between host 205 and card 210 pertaining to an authorization access. As a possible anti-tampering measure, if N successive authorization attempts are unsuccessful, the entire protected store area may be erased. Host 205 begins a transfer operation by writing an encrypted license file 245 to card 210. The license contains rights and restrictions to apply to file 245, key 250 that enable card 210 to decrypt content file 245, and possibly a license signature that may be used to detect license tampering. Key 250 is decrypted using keys from the authorization process and stored in protected memory 235 (protected store 510). If the license contains time-restricted rights with a time-limit denoted as a value other than infinite, the desired time period is extracted from the license, or alternatively, the host may request an expiration time period as denoted in the protocol used to communicate between the client and the host. An address in time-limited store 515 is reserved by the programming algorithm that best fits the desired time-limit period. This address (bit) is cleared to logical FALSE and serves as the gating time-sensitive logic bit for data that is currently being transferred. Encrypted license file 245 continues to be written into protected store 510. When transfer is complete, the time-sensitive bit is programmed by the programming algorithm.

In other aspects of implementing an embodiment of the present invention, host 205 reads information from card 210. Similar to the actions discussed above, the reading process begins with host 205 being authorized by card 210. If authorization is successful, one or more keys are exchanged between host 205 and card 210 pertaining to an authorization access. Host 205 retrieves content file 245 from clear store 505. Once retrieval is complete, host 205 requests content decryption key 250 for content file 245 in clear store 505. The license and key are identified and requested by host 205 by specifying a path to content file 245 in clear store 505 as a parameter supplied to a protected store access routine. The controller in card 210 inspects the license to determine if access is allowed by rights contained in the license and if the time-sensitive bit is checked and found not to be expired. If both are true, content key 250 is encrypted using a host key and returned to host 205. Host 205 decrypts content key 250 using its private key to enable host 205 to decrypt content file 245 with key 250. The aspects of public and private keys are not discussed here, but one ordinarily skilled in the art is familiar with secure transfer of data.

Figure 6:
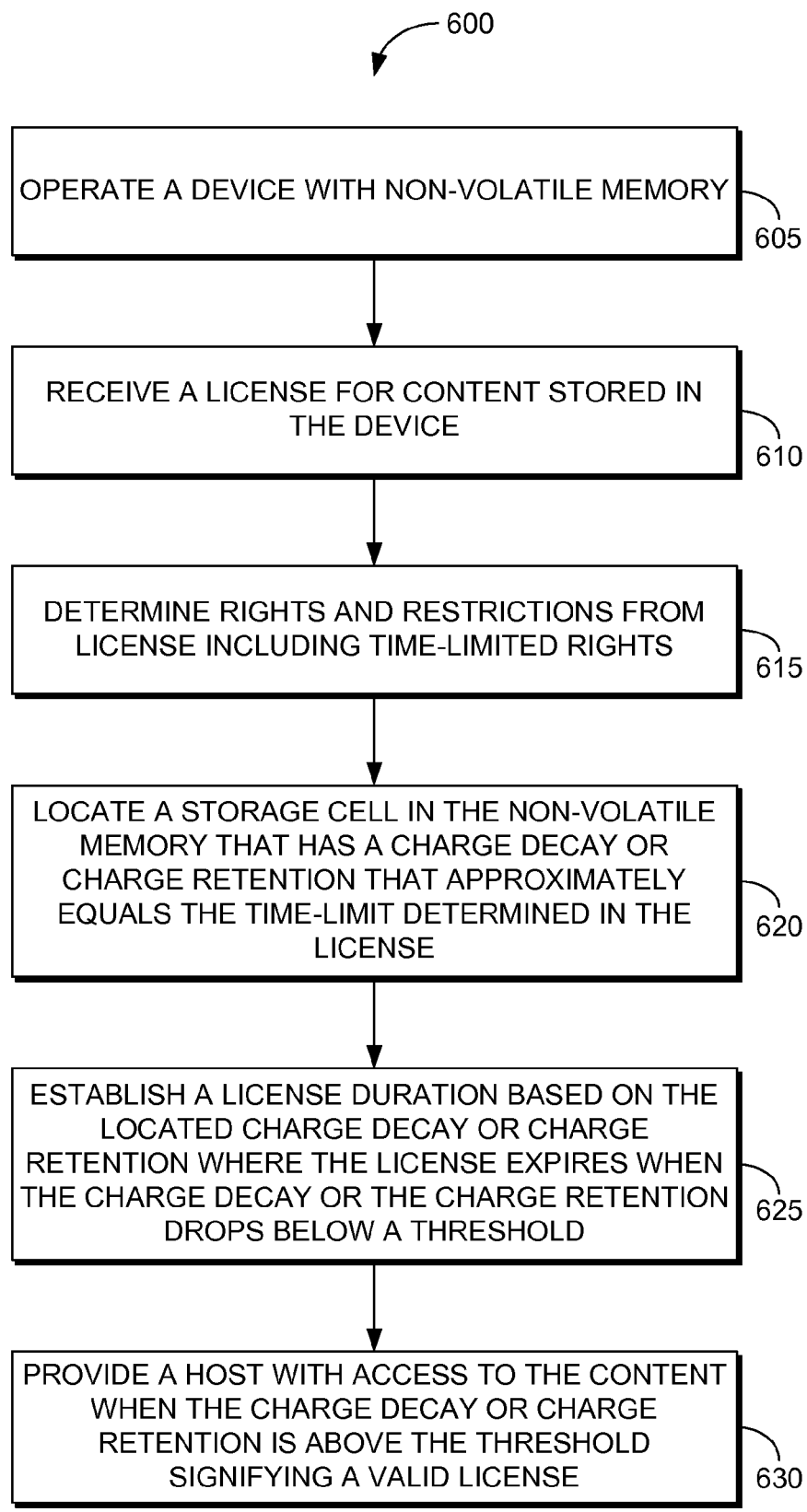
FIG. 6 is a flowchart of an exemplary process for operating an embodiment of the present invention.

Turning now to FIG. 6, a process for operating an embodiment of the present invention is shown in a method 600. Method 600 explains the activities that occur in FIGS. 2-5. In a step 605, a user operates a device with non-volatile memory. Such devices are discussed above in detail. Although not shown in method 600, the device may be connected to a host such as host 205. In a step 610, the device receives a license for content stored in the device. The license and content may be transferred to the device from the host.

When the host accesses the content on the device, the software and controller on the device determine rights and restrictions from the license including time-limited rights or the host has a specified desired expiration time in some other manner in accordance with a client/host communication protocol (step 615). In a step 620, the software and the controller locate a storage cell in the non-volatile memory that has a charge decay or charge retention that approximately equals the time-limit determined in the license. The term "approximately" is used because the software and the controller selects the storage cell with the closest time limit found in the license. In some cases, the storage cell may provide a time sequence that is slightly over or slightly under the time limit in the license but not preferably more than fifteen percent (15%) of the required value. Embodiments of the present invention are not prohibited from selecting varying time sequences in storage cells. In addition, the host/client communication protocol can communicate device capabilities with regard to available retention times, and host software can use this information to select an alternative retention time that is appropriate for the application, and/or involve the user in making an informed decision if possible. However, embodiments may provide a bridging action if a time value for a storage cell expires before the license's time limit is expired. The software and controller may select another storage cell to continue the validity of the license.

In a step 625, a license duration is established based on the located charge decay or charge retention where the license expires when the charge decay or charge retention drops below a threshold. This threshold may be a value of zero or it may be a minimum value that corresponds to the voltage in floating gate 315. In a step 630, host 205 is provided with access to content file 245 when the charge decay or charge retention is above the threshold (asserted TRUE) signifying a valid license.

Figure 7:
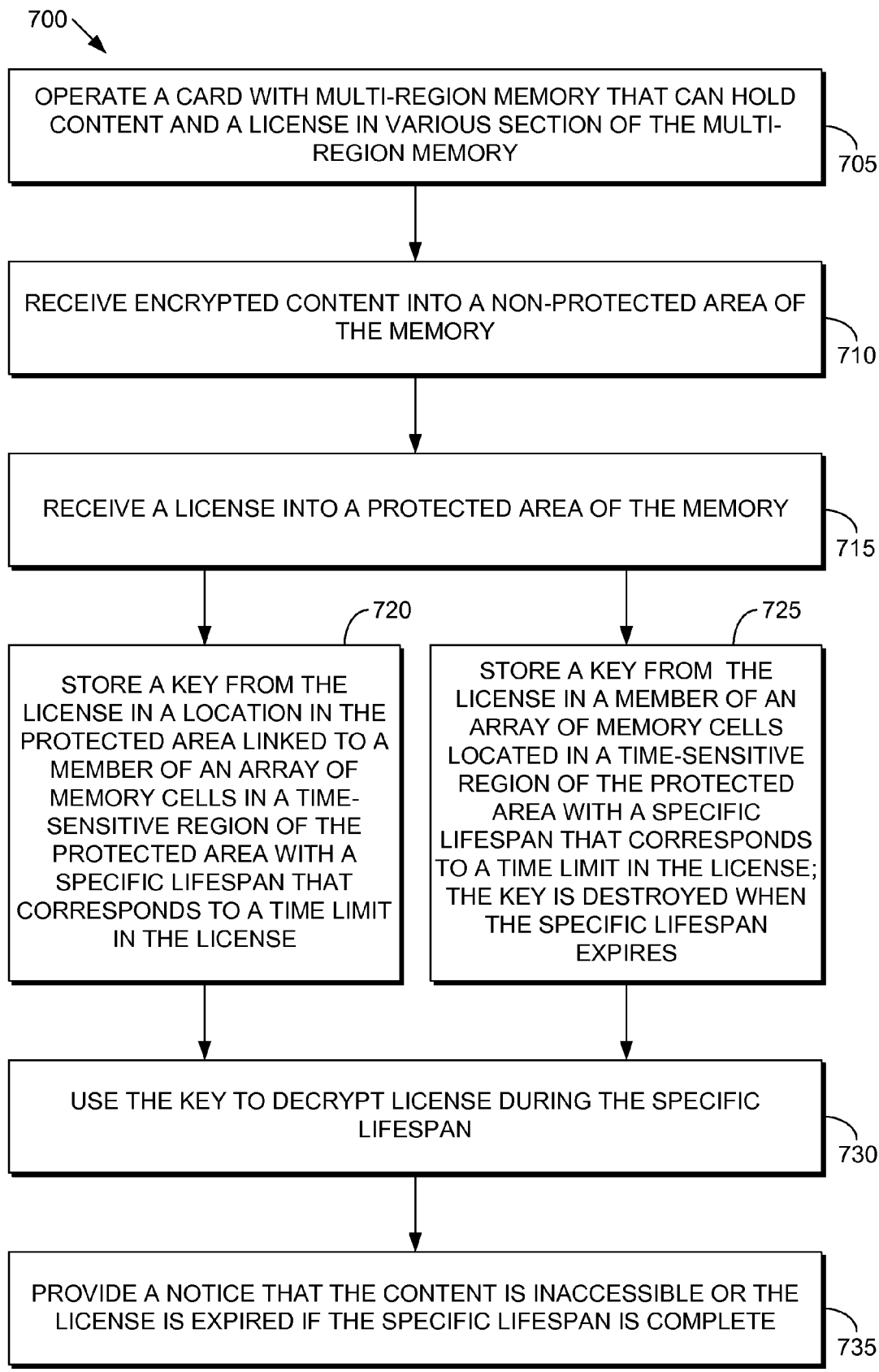
FIG. 7 is a flowchart of another exemplary process for operating an embodiment of the present invention.

In FIG. 7, another process for operating an embodiment of the present invention is shown in a method 700. In a step 705, an NVM card operates with a multi-region memory that can hold content (245) and a license in various sections of the multi-region memory. In a step 710, encrypted content is received into a non-protected area of the memory (505). In a step 715, a license is received into a protected area of the memory (510). One embodiment of the present invention may store a key from the license in a location in the protected area (510) and link it to a member of an array of memory cells in a time-sensitive region (515) of the protected area with a specific lifespan that corresponds to a time limit in the license as shown in a step 720. The key becomes inaccessible when the time runs out in the member (storage cell). Another embodiment of the present invention may store a key from the license in a member of an array of memory cells in a time-sensitive region (515) of the protected area with a specific lifespan that corresponds to a time limit in the license. In this embodiment, the key is destroyed when the specific lifespan expires as shown in a step 725.

With both embodiments and steps 720 and 725, the key is used to decrypt the license during the specific lifespan in a step 730. In a step 735, a notice is provided that the content is inaccessible or the license is expired if the specific lifespan is complete or has expired.

The prior discussion is for illustrative purposes to convey exemplary embodiments. The steps discussed in FIGS. 6 and 7 may be executed without regards to order. Some steps may be omitted and some steps may be executed at a different time than shown. For example, step 615 may be executed before step 610, and step 715 may be executed before step 710. The point here is to convey that the figures are merely exemplary for the embodiments of the present invention and that other embodiments may be implemented. It will be understood that certain features and sub-combinations are of utility and may be employed without reference to other features and sub-combinations and are contemplated within the scope of the claims.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for setting a lifetime of a license in a non-volatile memory device, without a battery, associated with a content, comprising:
   connecting to a host by the device operating a set of software on the device that can connect to a host;
   receiving by the device an encrypted content from the host;
   receiving by the device a license with a key;
   determining by the device an original unique lifespan that identifies a time of duration that ends when a charge retention in the member of an array of memory cells decays below a threshold;
   determining by the device a location in the non-volatile memory of the device that is associated with the member of the array of memory cells with an original unique lifespan;
   storing the key in the location of the non-volatile memory wherein a time limit in the license corresponds with the member in the array with the original unique lifespan;
   during the original unique lifespan, decrypting the content using the key
   determining by the device whether the original unique lifespan for the member has expired based on the charge retention in the member; and
   preventing an access to the content when the original unique lifespan for the member expires wherein the charge retention in the member has decayed below the threshold.

2. The method of claim 1, further comprising providing a notice that the content is inaccessible or the license is expired when the original unique lifespan for the member expires and an attempt to access the key is made.

3. The method of claim 2, further comprising associating the key with another member of the array to gain another unique lifespan to continue the license when the original unique lifespan terminates before an expiration of the license or terminates before the time limit is reached.

4. The method of claim 2, further comprising sending instructions from the host to the set of software on the device wherein the set of software at least one of selects the member of the array of memory cells or stores the key in the location of the non-volatile memory.

5. The method of claim 2, wherein storing the key in the location comprises storing the key in the member of the away so that an expiration of the original unique lifespan of the member correspondingly destroys the key.

6. The method of claim 5, further comprising sending instructions from the host to the set of software on the device wherein the set of software at least one of selects the member of the array of memory cells or stores the key in the location of the non-volatile memory.

7. The method of claim 2, wherein the device is selected from a group including operating devices that contain a database, operating devices that contain a data store, or operating devices that contain a memory.

8. The method of claim 7, wherein the device is selected from a group including multi-memory region flash cards.

9. The method of claim 7, further comprising operating the host and the device together to select the location or the member based on one or more characteristics of the location or the member.

\* \* \* \* \*

UNITED STATES PATENT AND TRADEMARK OFFICE
CERTIFICATE OF CORRECTION

PATENT NO. : 7,590,600 B2  Page 1 of 1
APPLICATION NO. : 11/277660
DATED : September 15, 2009
INVENTOR(S) : Bovee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Twenty-first Day of September, 2010

David J. Kappos
*Director of the United States Patent and Trademark Office*